(12) United States Patent
Torres et al.

(10) Patent No.: US 11,620,843 B2
(45) Date of Patent: Apr. 4, 2023

(54) METAMODELING FOR CONFIDENCE PREDICTION IN MACHINE LEARNING BASED DOCUMENT EXTRACTION

(71) Applicant: INTUIT INC., Mountain View, CA (US)

(72) Inventors: Terrence J. Torres, Mountain View, CA (US); Venkatesh Coimbatore Ravichandran, Mountain View, CA (US); Karen Kraemer Lowe, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 292 days.

(21) Appl. No.: 17/006,648

(22) Filed: Aug. 28, 2020

(65) Prior Publication Data
US 2021/0073532 A1    Mar. 11, 2021

Related U.S. Application Data

(60) Provisional application No. 62/898,382, filed on Sep. 10, 2019.

(51) Int. Cl.
*G06K 9/00*     (2022.01)
*G06V 30/414*   (2022.01)
*G06K 9/62*     (2022.01)
*G06N 20/00*    (2019.01)
*G06V 30/416*   (2022.01)
*G06V 30/10*    (2022.01)

(52) U.S. Cl.
CPC ........ *G06V 30/414* (2022.01); *G06K 9/6256* (2013.01); *G06N 20/00* (2019.01); *G06V 30/416* (2022.01); *G06V 30/10* (2022.01)

(58) Field of Classification Search
CPC .... G06V 30/414; G06V 30/10; G06V 30/416; G06N 20/00; G06K 9/6256
See application file for complete search history.

(56) References Cited

U.S. PATENT DOCUMENTS 8,868,472 B1 *  10/2014  Lin ............................ G06N 5/02
                                                          706/12
2019/0347668 A1 *  11/2019  Williams ............... G06N 5/046

OTHER PUBLICATIONS

International Search Report dated Dec. 14, 2020 issued in International Application PCT/US2020/048758.
Written Opinion dated Dec. 14, 2020 issued in International Application PCT/US2020/048758.

* cited by examiner

*Primary Examiner* — Tuan H Nguyen
(74) *Attorney, Agent, or Firm* — DLA Piper LLP (US)

(57) ABSTRACT

A document extraction system executed by a processor, may process documents using manual and automated systems. The document extraction system may efficiently route tasks to the manual and automated systems based on a predicted probability that the results generated by the automated system meet some baseline level of accuracy. To increase document processing speed, documents having a high likelihood of accurate automated processing may be routed to an automated system. To ensure a baseline level of accuracy, documents having a smaller likelihood of accurate automated processing may be routed to a manual system.

20 Claims, 6 Drawing Sheets

METAMODELING FOR CONFIDENCE PREDICTION IN MACHINE LEARNING BASED DOCUMENT EXTRACTION

CROSS REFERENCE TO RELATED APPLICATIONS

This application claims the benefit of U.S. Provisional Application Ser. No. 62/898,382 filed Sep. 10, 2019, the entire contents of which is hereby incorporated by reference.

DETAILED DESCRIPTION OF SEVERAL EMBODIMENTS

Figure 1:
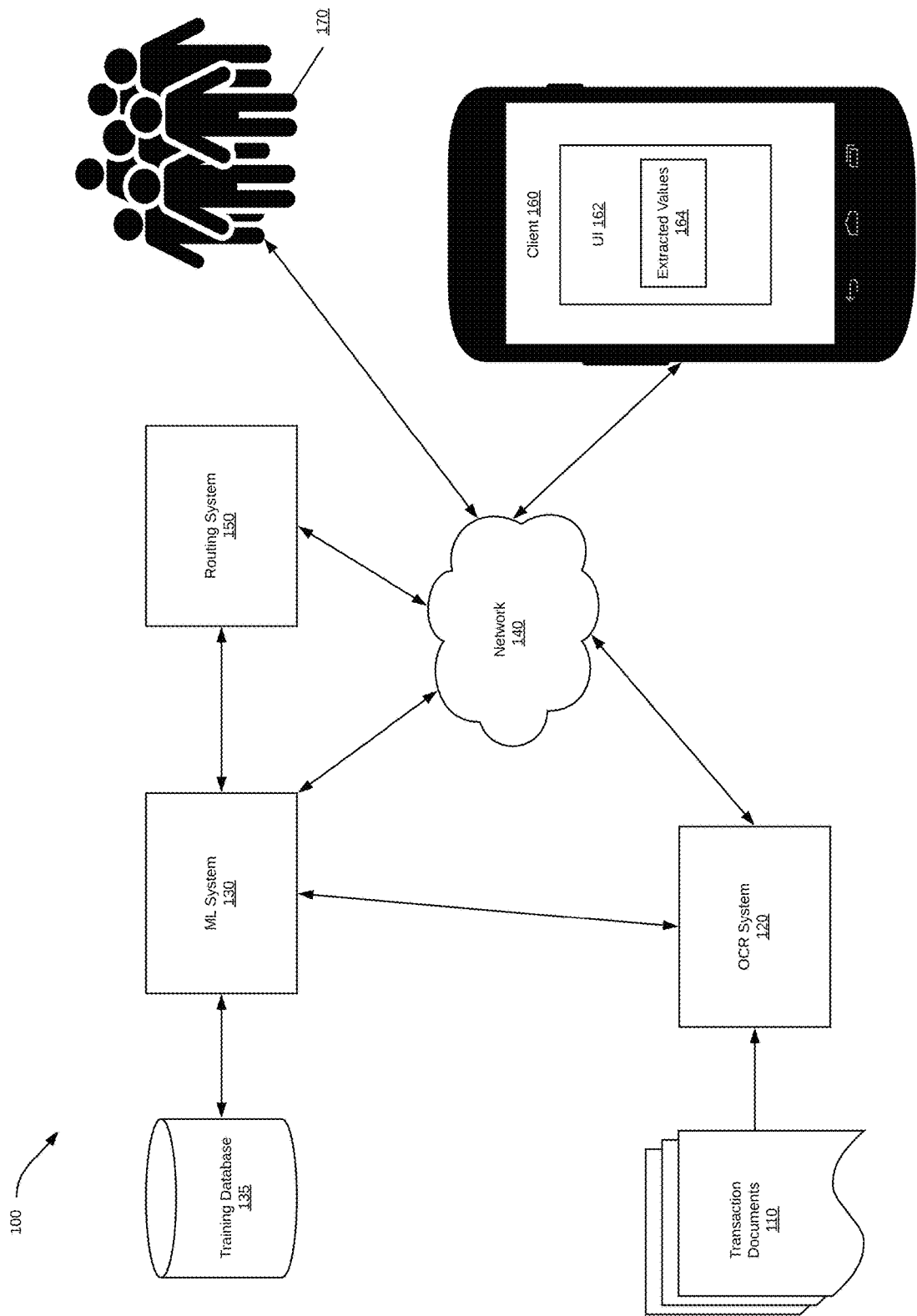
FIG. 1 shows a document extraction system according to various embodiments of the present disclosure.

Document processing tasks including data extraction and data entry are tedious yet essential tasks in many fields. To improve the speed and efficiency of document processing tasks, software can be used automate document processing. These automated systems, however, are never 100% accurate so some manual document processing is required to deliver precise, accurate data to customers. To streamline document processing tasks, it is necessary to distinguish the documents that may be processed with a highly level of accuracy using automated methods from the documents that must be processed manually. By efficiently routing documents to either machines or humans, the document processing tasks can be competed faster with high accuracy. Delivering the results of document processing tasks that may be accurately completed by automated techniques directly to the customer provides access to data more quickly and increases the amount of trust customers have in automated systems.

Various embodiments included in the disclosure may process transaction documents (e.g., receipts, transaction summaries, account statements, tax documents, and the like) to extract transaction details that may be used in bookkeeping, accounting, tax preparation, and other financial applications. In various embodiments, transaction details may include text values like vendor, amount, date, payment method, credit card number, account number, and the like. A hybrid system of humans and machines may be used to process transaction documents. A routing system may streamline document processing by efficiently distributing document processing tasks to either machines or humans using an extraction confidence prediction that anticipates the accuracy of document processing tasks performed using the automated system. The extraction confidence prediction may be made using a machine learning system that combines two or more machine learning models in an ensembled architecture. The routing system may use the confidence prediction to generate a routing decision that determines whether a document processing task is routed to the automated system or a manual system. By anticipating the accuracy of automated document processing before generating the results, the routing system efficiently uses the processing, memory, and network resources of the automated system and ensures a high level of accuracy.

Depending on the specific needs of users, the accuracy threshold maintained by the routing system may be adjusted to optimize for processing speed and/or accuracy. For example, adjusting the accuracy threshold higher may cause the routing system to assign more tasks for manual processing thereby decreasing speed and increasing accuracy. The reverse may also be true, wherein by adjusting the accuracy threshold lower, the routing system may assign more tasks for automated processing thereby increasing spend and decreasing accuracy. Various embodiments of the disclosure are flexible enough to fit particular user needs while also guaranteeing a baseline level of accuracy.

Embodiments disclosed herein are not directed to improvements in document processing, data entry, or text extraction generally, but rather to improvements in the accuracy, speed, and/or efficiency of routing systems for assigning document processing tasks and machine learning systems for generating confidence predications related to document processing accuracy. For example, humans may be uniquely adept at document processing, data entry, and text extraction based on deep personal knowledge and/or pattern recognition. However, due to the great many differences between how a human brain processes information and how a computer processes information, humans are less adept at anticipating how accurately a computer is likely to process a particular document selected from a large library of documents having different structures and subtle differences in the arrangement, appearance, and/or content of the document. Problems may also arise when humans try to assign a large volume of tasks in parallel. The disclosed embodiments have been developed specifically to address problems that only occur in automatic, computer-based routing systems for distributing document processing tasks and machine learning systems for generating confidence predictions. The disclosed embodiments improve automatic, computer-based document routing and confidence prediction in several specific ways which are discussed throughout this specification. Moreover, while transaction documents are used as examples herein, the disclosed techniques may be useful to route and predict confidence levels for other types of documents (e.g., technical documents, journal articles, government regulations, financial disclosures, and the like).

Figure 6:
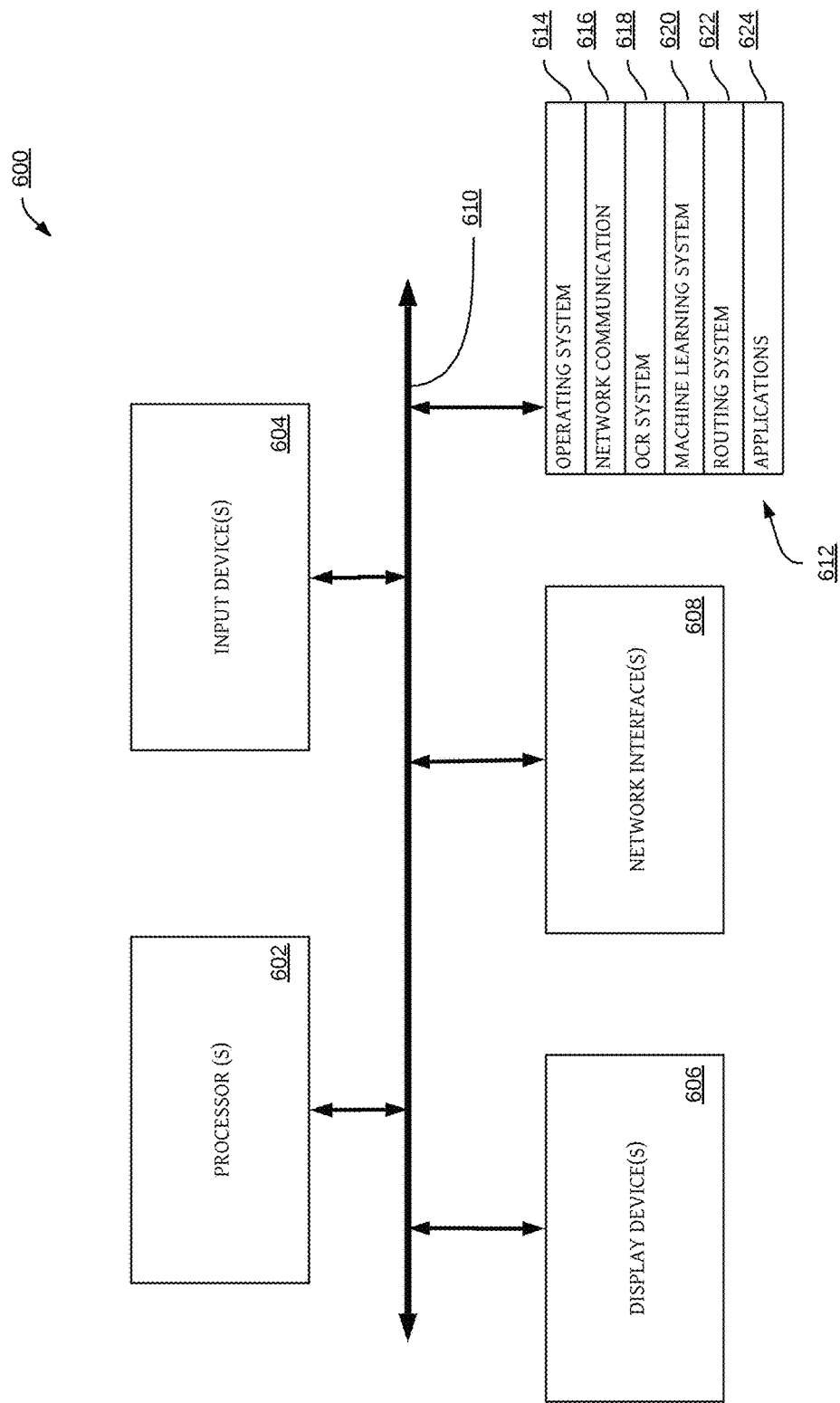
FIG. 6 shows a computing device according to various embodiments of the present disclosure.

FIG. 1 shows a document extraction system 100 according to various embodiments of the present disclosure. System 100 may include a plurality of functional elements that may be provided by one or more computing devices (e.g., one or more computing devices 600 as shown in FIG. 6). These elements may work together to automatically route document processing tasks, generate confidence predictions, and/or perform document extraction.

For example, system 100 may include at least one client 160. Client 160 may be any device configured to present UIs 162 including one or more extracted text values 164 and receive inputs thereto into one or more fields included in the UI. For example, client 160 may be a smartphone, personal computer, tablet, laptop computer, or other device.

System 100 may include OCR system 120. In some embodiments, OCR system 120 may be a hardware and/or software component of client 160. In some embodiments, OCR system 120 may be a hardware and/or software component accessible to client 160 through network 140 (e.g., OCR system 120 may be hosted by a server computer). As described in greater detail below, OCR system 120 may covert transaction documents 110 into machine readable text data using optical character recognition (OCR), pdf parsing, and the like.

System 100 may include ML system 130, which may be a hardware and/or software component accessible to client 160 through network 140 in some embodiments (e.g., ML system 130 may be hosted by a server computer). As described in greater detail below, ML system 130 may use data from training database 135 and/or other sources to train one or more machine learning models to generate extraction predictions and confidence predictions for document extraction.

System 100 may include routing system 150. In various embodiments, routing system 150 may be a hardware and/or software component of client 160. In various embodiments, routing system 150 may be a hardware and/or software component accessible to client 160 through network 140 (e.g., routing system 150 may be hosted by a server computer). As described in greater detail below, routing system 150 may distribute (e.g., via a network 140) tasks to a crowd of humans 170 for manual document processing and/or results from data processing tasks performed by an automated document processing system (e.g., ML system 130) to client 160.

In some embodiments, one or more of client 160, OCR system 120, ML system 130, and/or routing system 150 may communicate with one another through network 140. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 140 may be the Internet and/or other public or private networks or combinations thereof.

A single client 160 and separate, single OCR system 120, ML system 130, and/or routing system 150 are shown for ease of illustration, but those of ordinary skill in the art will appreciate that these elements may be embodied in different forms for different implementations. For example, system 100 may include a plurality of clients 160, many of which may access different data. Moreover, single OCR system 120, ML system 130, and/or routing system 150 may each be components of a single computing device (e.g., computing device 500 described below), or a combination of computing devices may provide single OCR system 120, ML system 130, and/or routing system 150. In some embodiments, the operations performed by client 160 and at least one of the separate, single OCR system 120, ML system 130, and/or routing system 150 may be performed on a single device (e.g., without the various components communicating using network 140 and, instead, all being embodied in a single computing device).

Figure 2:
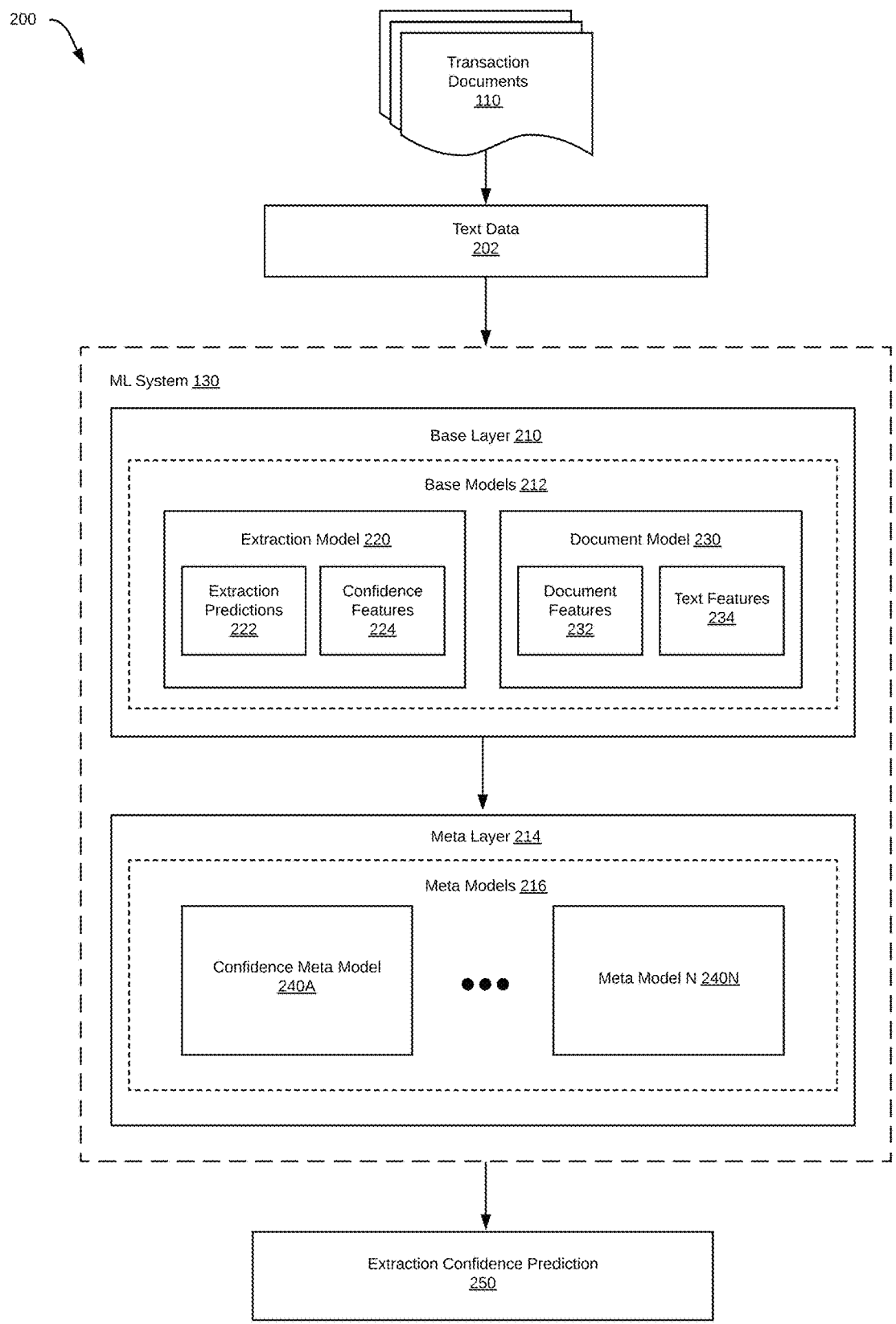
FIG. 2 shows a machine learning system according to various embodiments of the present disclosure.

FIG. 2 shows an example ML system 130 according to various embodiments of the disclosure. The ML system 130 may ingest text data 202 as input and generate confidence predictions (e.g., extraction confidence predictions 250) as output. The ML system 130 may be stored in a repository. The repository may be any type of storage unit and/or device (e.g., a file system, database, collection of tables, or any other storage mechanism) for storing data. Further, the repository may include multiple different storage units and/or devices. The multiple different storage units and/or devices may or may not be of the same type or located at the same physical site.

The ML system 130 may include an ensembled architecture having multiple layers of machine learning models structured to promote knowledge transfer between each layer. The ensembled architecture may include a base layer 210 having one or more base models 212 and a meta layer 214 having one or more meta models 216. For example, the meta models 216 may include a confidence meta model 240A and a plurality of other meta models represented by meta model N 240N. Each layer included in the ML system 130 may process training data to acquire knowledge for a particular application. For example, to complete document extraction tasks, the one or more base models may process text data 210 generated from transaction documents 110. To generate confidence predictions for the routing system 150, the meta models may process one or more feature sets generated by the base models. This training method extracts insights about transaction documents 110 using the one or more base models. Document knowledge is then transferred to the meta models to enhance the accuracy of confidence predictions.

Text data 202 may be generated from transaction documents 110 using one or more preprocessing steps. In various embodiments, transaction documents 110 may be received as structured data (e.g., JSON files, XML files, HTML files, PDF files, and the like) and or unstructured data (e.g., images, for example, JPEG files, TIFF files, PNG files, and the like). Text data 202 included in transaction documents 110 may be converted to machine readable text data 202 using OCR, pdf parsing, a text conversion machine learning model, or other image to text retrieval techniques. Text data 202 may be used to train one or more base models 212 (e.g., an extraction model 220 and/or a document model 230). The extraction model 220 and document model 230 are used to generate document records for the transaction documents 110. Document records may include a type of document predicted by the document model 230, extracted structured data included in the extraction predictions 222 generated by the extraction model 220 and other metadata (e.g., the language, user identifier (id), product id, screen id, source, and other context of the transaction document).

To generate extraction predictions 222, the extraction model 220 may derive attributes of particular classes of extracted text values (e.g., vendor, transaction amount, payment method, credit card number, account number, transaction date, items sold, and the like) from training data. The training data may include values and other text data 202 that have been extracted from transaction documents 110. The text data 202 included in the training data may be labeled with the class (i.e., vendor, transaction amount, payment method, credit card number, account number, transaction date, items sold, and the like) associated with each extracted value. For example, dates extracted from transaction documents 110 may be labeled as dates in the training data, vendor names may be labeled as vendors, dollar amounts may be labeled as amounts, and the like. The extraction model 230 may then be trained to learn attributes of each class from text data 202 in the training dataset. The learned attributes may include, for example, location of the text in the transaction document, particular sequences of alpha numeric characters, specific strings, values, or other content included in the text data 202, specific symbols or tags (e.g., XML tags, HTML tags, or other markup language tags) included in the text data 202 and or structured representation of the transaction documents, and the like. The extraction model 220 may compare the learned attributes to the text data 202 input into the model to determine the classes of each piece of text data. The predicted classes may be output as labels included in the extraction predictions 222. To facilitate the comparison, the input text data may be converted to a vector or other numerical representation of words, values, and or symbols included in the input text data. Each piece of text data may then be paired with its predicted class and the text data and predicted class may be output as extraction predictions.

Figure 3:
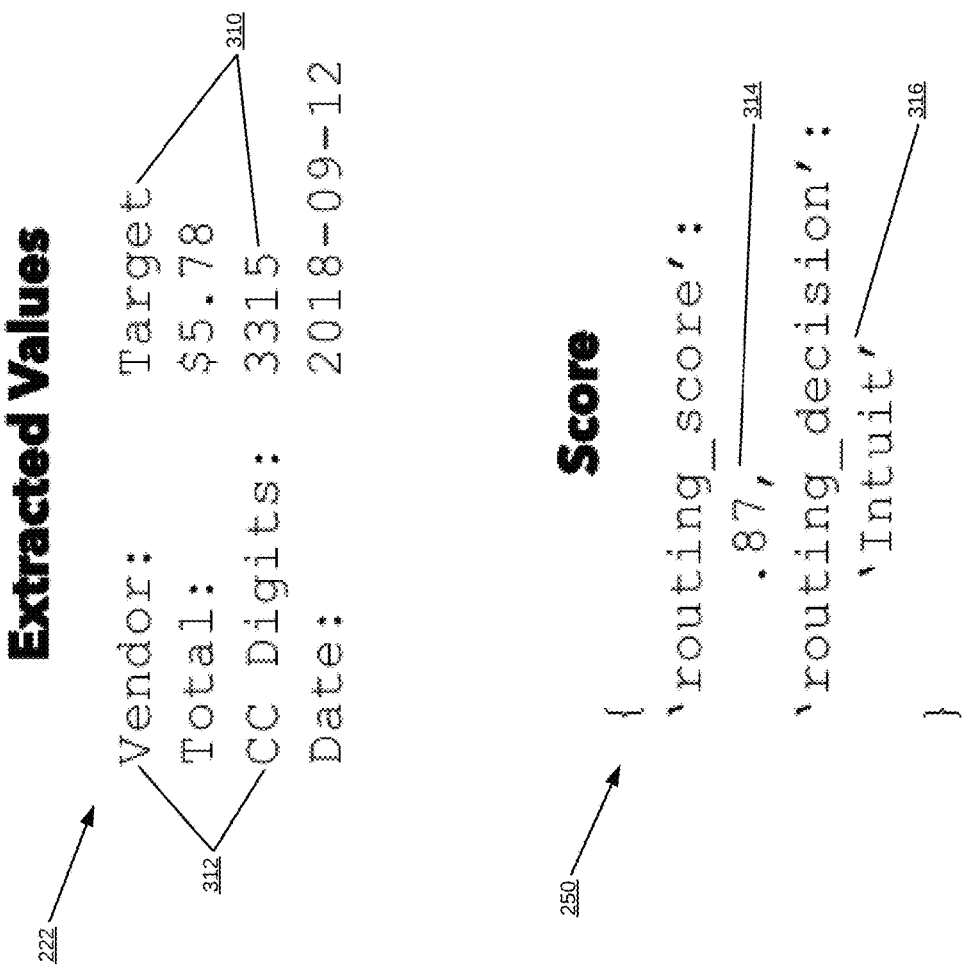
FIG. 3 shows extraction predictions and an extraction confidence prediction according to various embodiments of the present disclosure.

Extraction predictions 222 may include extracted text data and one or more labels describing the values, words, and or symbols that are included the text values extracted from the transaction documents 110. The labels may describe the location of the text values within the text data 202 and or transaction document 110 (e.g., line, character position, pixel coordinates of the text values within an image of transaction document 110 and the like) and the type of text value (e.g., date, vendor, amount, credit card number, and the like). For example, labels generated for the "hardware store" piece of text may include "vendor" indicating the type of text value for "hardware store". Location labels may include, for example, "first column line 10" indicating the line position of the text in a transaction document and or "132 pixels down and 76 pixels to the left from the top pixel" indicating the location of the text in an image format of the transaction document. The labels and extracted text data included in the extraction predictions 222 may both be included in the document record generated for each transaction document. FIG. 3 (discussed below) illustrates a portion of a document record generated for a transaction document that includes extracted text values and labels predicted for the extracted text values by the extraction model 220.

The extraction model 220 may generate confidence features 224 describing the likelihood the extraction predictions 222 are accurate. The confidence features 224 may include attributes of the extracted text and or transaction document that indicate the text values and or labels included in the extraction predictions are accurate and or inaccurate. The confidence features 224 may include document level features, for example, the file format of the transaction document, if the transaction document is an image, the resolution of the image, the size of the transaction document, the source of the transaction document, the capture method of the transaction document, and the like. The confidence features 224 may also include text level features, for example, the percentage of characters that include a particular alpha numeric character or special character (i.e., "$", "%," ".", and the like), term frequency counts for particular words, word embeddings and other vectorized text representations (i.e., word vectors from another machine learning model), and the like). The confidence features 224 may also include transaction level features, for example, number of transactions included in a transaction document, earliest transaction date, minimum transaction account, name of the vendor or other parties to the transaction, and the like. One or more layers of the extraction model 220 may be trained to generate confidence features 224 for input text data. The one or more confidence feature generation layers may be trained, for example, using a training dataset including text data labeled with the correct confidence features 224. Based on the training data, the confidence feature generation layers may derive attributes of text data 202 (e.g., location of the text data in the transaction document, keywords and other content included in the text data 202, context features describing the transaction document the text data was extracted from, and the like) that indicate a particular confidence feature 224 should be associated with the text data 202. The confidence feature generation layers may also determine confidence features 224 for input text data using rules, heuristics, algorithms, or other supervised learning techniques.

The extraction model 220 may be a neural network or other machine learning model designed to process text data 202. In various embodiments, the extraction model 220 may be the compilation of two or more neural networks and/or other machine learning models. For example, the extraction model 220 may combine a long short-term memory (LSTM) network with a conditional random field (CRF) algorithm. Extraction models 220 that include both LSTM network layers and CFR network layers (e.g., Bidirectional LSTM-CRF implementations, biLSTM-CRF) may estimate the probability of labels included in the extraction predictions 222 based on term context (e.g., the words around the term) using the bidirectional LSTM (biLSTM) network. The CRF network layers may then generate new label probabilities by looking at the sequence of labels predicted by the biLSTM layers and refining the predicted label probability based on the label transition probabilities generated by the CRF algorithm. The transition probabilities may describe how often each predicted label occurs before and or after a particular label or a particular sequence of labels. The transition probabilities provide additional transaction document level context (e.g., insight into the ordering of vendors, amounts, dates, and other components within a transaction document) that may be used to augment the label predictions generated by the biLSTM layers.

For example, if the initial predictions generated by the biLSTM network include a date label followed by two consecutive vendor labels, the CRF algorithm may be applied to change one of the two consecutive vendor labels to another label type (e.g., an amount label). The CRF algorithm may change the vendor label based on the probability of a particular sequence of labels occurring in transaction documents included the training data set. For example, the CRF algorithm may be applied to determine the probability of the sequence of a date label followed by two consecutive vendors labels is very low because only 1 or 2 transaction documents in a training dataset of 10,000 of more documents included this particular sequence of labels. The CRF algorithm may then change one or more the labels in the sequence based on the low probability to generate extraction predictions 222 having labels that are more likely to occur.

The biLSTM network layers may generate a learned representation of the words included in the text data 202. The learned representation generated by the biLSTM may generate a vector representation of the text data 202 based on the forward direction sequence and the backward direction sequence of the words included in the text data 202. The biLSTM vectors may also include features derived from the forward and backward direction sequences of words that surround the text data 202 in the transaction documents 110. Term frequency inverse document frequency (TF-IDF) vectorization techniques, Word2vec word embeddings, and other feature generation methods may also be used to generate numerical representations of text data 202. TF-IDF methods generate vector representations of the text data 202 based on the frequency the words in the text data 202 appear in a particular corpus of documents. Word2vec word embeddings generate vector representations of text data 202 based on the meanings of words and the relationships between words included in the text data 202.

The document model 230 may generate one or more text features 234 describing the text data 202 included in the transaction documents 110. The document model 230 may also generate document features 232 describing the context (e.g., document source, language, structured data format, capture method, user id, product id, screen id, and the like) of the transaction documents 110. The document model 230 may be a neural network or other machine learning model designed to process text data 202 and or session data generated during capture of each transaction document. Text features 232 may include vectors and other numerical representations of words, values, symbols and other content included in the text data 202. Text features 232 may also include relevant terms, patterns particular to a document type or source, heuristics indicative of data accuracy or quality, and other text based features that may be encoded in a vector representation. The document model 230 may vectorize text data 202 by, for example, calculating term frequency—inverse document frequency (TF-IDF scores) for words included in text data. The document model 230 may also process text data 202 using one or more classification and/or pattern recognition algorithms to generate document features 232 indicative of document type, document source, text data quality/accuracy, and the like.

Document features 232 provided by the document model 230 and extraction predictions 222 and confidence features 224 provided by the extraction model 220 are used to train the meta models 216. The meta models 216 may include a confidence meta model 240A and a plurality of other meta models represented by meta model N 240N. By training meta models 216 of the meta layer 214 using training data generated by the one or more base models 212 in the base layer 210, the ML system 130 may transfer knowledge of transaction documents 110 to the meta layer 214 to improve the accuracy of predictions made by the confidence meta model 240A and the plurality of other meta models represented by meta model N 240N. In various embodiments, the confidence meta model 240A may be a neural network or other machine learning model that generates a binary prediction (e.g., accurate or not accurate) for extraction predictions 222 generated by the extraction model 220. The confidence meta model 240A may generate a binary prediction (e.g., an extraction confidence prediction 250) by generating an extraction accuracy probability score and comparing the extraction accuracy probability store to an accuracy threshold.

FIG. 3 illustrates an example of extraction predictions 222 generated by the extraction model 220. The extraction predictions 222 may include, for example, a plurality of text values 310 captured from transaction documents 110 and labels 312 describing the class associated with each text value 310. For example, the extraction predictions 222 may include a text value "Target" having a "Vendor" label that describes the "Target" text value as being a type of vendor. The extraction predictions 222 may also include a text value "$5.78" having a "Total" label that describes the "$5.78" value as being a total amount listed in the transaction document. Both the text values 310 and the labels 312 included in the extraction predictions 222 may be generated by the extraction model 220. The extraction predictions 222 shown in FIG. 3 are not the only types of text values 310 and labels 312 that may be extracted from transaction documents 110. Any other text values included in a transaction document 110 and the corresponding labels may be included in extraction predictions 222. For example, text values 310 and labels 312 describing the parties to the transaction (e.g., the purchaser, seller, and the like), the goods exchanged in the transaction (e.g., computers, equipment, furniture, and the like), the amount paid for each item in the transaction, the location of the transaction, the delivery method for the goods involved in the transaction, and the like.

To train the confidence meta model 240A, text data 202 included in a set of transaction documents 110 may be manually extracted and labeled to generate a ground truth set of extraction results. The ground truth set of extraction results are derived by manual labeling and therefore are 100% accurate. The same transaction documents 110 may be processed by the extraction model 220 to generate extraction predictions 222 for the set of transaction documents 110. The extraction predictions 222 may then be compared to the ground truth results for the set of transaction documents 110 to label each extraction prediction as accurate or inaccurate. Extraction predictions 222 that match the ground truth results will be given an accurate label. Extraction predictions that do not match the ground truth results will be given an inaccurate label. The labeled extraction predictions are added to confidence meta model training dataset. Confidence features 224, document features 232, and text features 234 generated for the text data included document records for the documents included in the set of transaction documents may also be added to the confidence meta model training dataset.

The confidence meta model 240A is trained on the confidence meta model training dataset to learn the confidence features 224, document features 232, text features 234, and other aspects of accurate extraction predictions and inaccurate transaction predictions. After training, the confidence meta model 240A may be evaluated using a new set of transaction predictions 222 generated for a different set of transaction documents (i.e., validation set of transaction documents). The confidence meta model 240A may receive the new extraction predictions 222 as input and generate an extraction confidence prediction 250 as output. As shown in FIG. 3, the extraction confidence prediction 250 may include a confidence score 314 and or other accuracy prediction for the extraction predictions 222. The extraction confidence prediction 250 may also include a routing decision 316 that is based on the confidence score 314. More details of the routing decision 316 are discussed below.

Extraction predictions receiving a high confidence score (e.g., at least 0.85) and extraction predictions receiving a lower confidence score (e.g., less than 0.85) may be compared to the ground truth results. If a high percentage (e.g., at least 85%) of the extraction predictions receiving a high confidence score match the extraction predictions included in the ground truth results and or a high percentage (e.g., at least 85%) of the extraction predictions receiving a low confidence score do not match the ground truth results, the performance of confidence meta model 240A may be satisfactory and the confidence meta model 240 may be deployed. If a low percentage (e.g., less than 85%) of the extraction predictions receiving a high confidence score match the extraction predictions included in the ground truth results and or a low percentage (e.g., less than 85%) of the extraction predictions receiving a low confidence score do not match the ground truth results, confidence meta model 240A may be retrained using a different confidence meta model training set (e.g., a training dataset including extraction predictions from a different set of transaction documents, a training dataset including different features, and the like), different hyperparameters, different model architectures, different training algorithms, and the like. The retrained confidence meta model 240A may then be re-evaluated on a new set of extraction predictions (i.e., a new validation set) until the performance of the confidence meta model 240A is satisfactory and the confidence meta model 240A may be deployed.

The confidence meta model 240A may be optimized to accurately predict the accuracy of the extraction predictions 222 by adjusting one or more parameters, weights, or other aspects of the model and or training on additional and or different features (e.g., confidence features 224, text features 232, and or document features 232). As shown in FIG. 3, extraction confidence predictions 250 generated by the confidence meta model 240A may include a routing decision 316 that is used to route document extraction tasks within the document extraction system. For example, if the confidence meta model 240A generates an extraction confidence prediction 250 below the confidence threshold (e.g., 90% confidence), the routing decision 316 may route the transaction document to a manual system for manual extraction. If the confidence meta model 240A generates a confidence prediction 250 above the confidence threshold (e.g., 90% confidence), the routing decision 316 may route the transaction document to the ML system 130 for automated extraction and deliver the extraction results based on the extraction predictions 222 generated by the extraction model 230 directly to a client device of the user.

Figure 4:
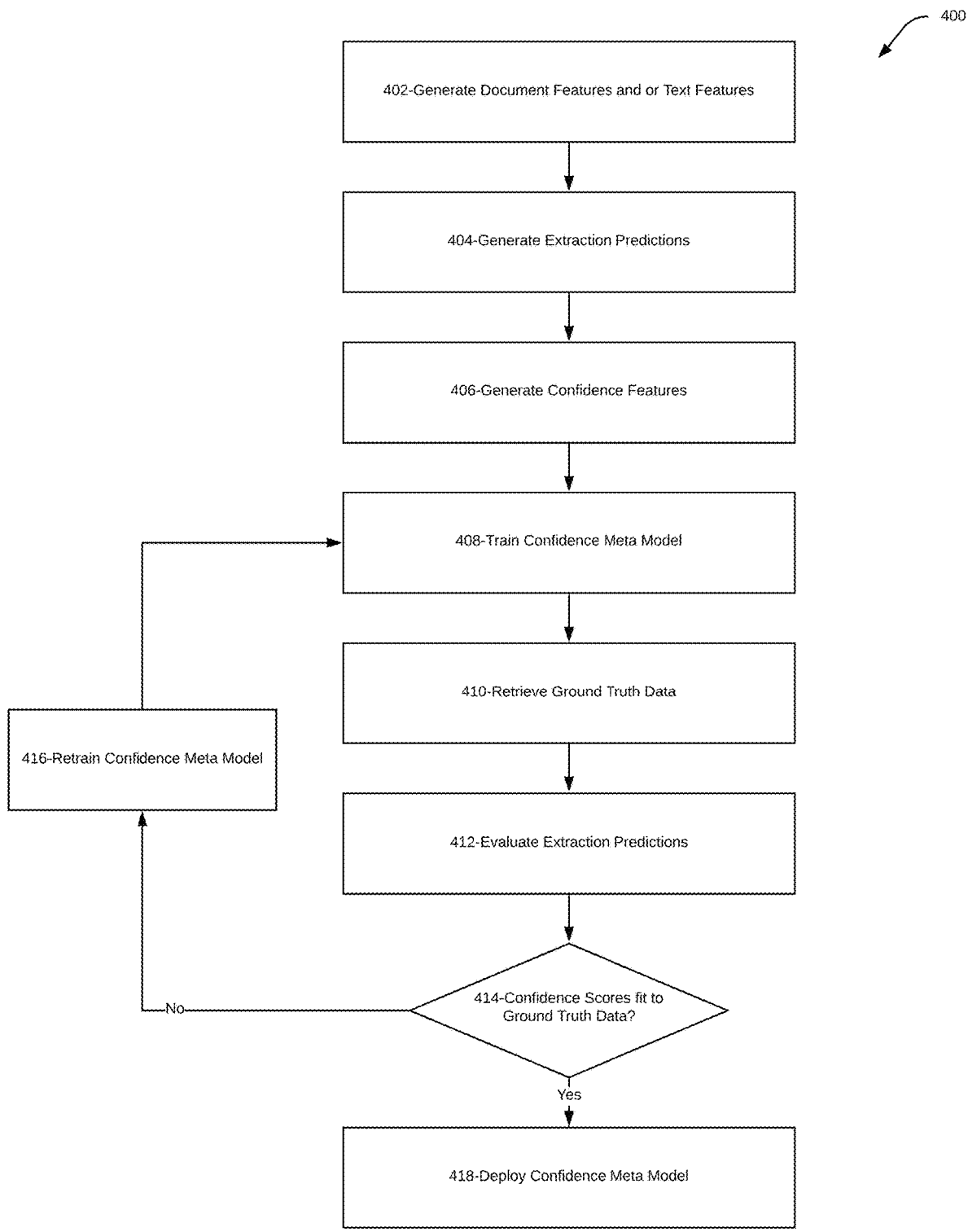
FIG. 4 shows a confidence prediction process according to various embodiments of the present disclosure.

FIG. 4 shows a confidence prediction training process 400 that may be performed by an ML system 130 according to an embodiment of the present disclosure. The training process 400 may generate a confidence meta model 240A for generating extraction confidence predictions 250 for extraction predictions. The extraction confidence predictions 250 may include a confidence score and a routing decision that may be used to route transaction documents to an automated document processing system for automated extraction of text data and a manual document processing system for manual extraction of text data based.

At step 402, ML system 130 may generate document features and or text features for text data retrieved from transaction documents included in a sample set of transaction documents. The transaction documents included in the sample set of transaction documents may have ground truth extraction results including text values that are manually extracted from the transaction documents and labels describing the text values that are annotated manually by humans. Text features generated by the ML system may describe the text data included in the transaction documents. For example, text features may include vectors and other numerical representations of words, values, symbols and other content included in the text data. Text features may also include relevant terms, patterns of words, values, and or symbols particular to a document type or source and other text based features that may be encoded in a vector representation. Document features generated by the ML system may describe the context (e.g., document source, language, structed data format, capture method, user id, product id, screen id, and the like) of the transaction documents. Document features may also include heuristics indicative of a particular source of text data and or the accuracy or quality of the text data included in the particular source.

The text features and or document features may be generated using one or more known and or proprietary feature extraction methods. For example, text features may be generated using text vectorization methods known in the art (e.g., TF-IDF, Bag of Words, Word2Vec, and the like). Document features may be generated using algorithms, statistical calculations (e.g., probabilities, averages, and the like), heuristics, rules, conditions, and the like. For example, document features may be derived on regular expression matching constraints (e.g., does the extracted total value have the form: n-digits, followed by a decimal, followed by two digits; does the extracted vendor value have a string length matching a string length of a known vendor; does the extracted credit card number value have 16 digits; does the extracted account number value have 9 digits, and the like). Document features may also be learned from a training dataset of text data extracted from transaction documents. For example, one or more feature extraction layers of a machine learning model (e.g., LSTM layers, convolution layers, logistic regression layers, and the like) may be trained to learn document features from a training dataset including text data having labels describing the document features included in the text data. Document features may be general document features including the number of special characters in the text, the number of numerical digits present, the maximum distance between special characters, and the like. Document features may be specific to a particular document type (e.g., receipt, tax form, financial statement, and the like) and/or document source (e.g., individual, business, vendor, and the like).

Using the one or more text features and or document features, the document model may classify the document type and or document source for each document included in the sample set of transaction documents. The document type and other document classifications may be stored in a document record for the transaction document. The document record may also include the document type, extraction predictions including structured text data extracted from the transaction document, and other metadata describing the transition document (e.g., language, source, capture method, and the like). The document type and other metadata included in the document record may be provided as additional document features to the extraction model to help generate extraction predictions.

At step 404, extraction predictions may be generated for each transaction document included in the sample set of transaction documents. Extraction predictions may include text values extracted from the transaction documents as well as labels describing the text values. The labels may include, for example, the location within of the text values within the transaction document, a class or type of data associated with the text value (i.e., vendor amount, date, etc.). The extraction predictions may be generated by the extraction model. For example, extraction predictions may be generated using logit values generated by the biLSTM layers and or marginal probabilities generated by the CRF algorithm. In various embodiments, probability scores for each label may be generated from the logit values and or the marginal probabilities by executing one or more operations including averaging, selecting a max value, selecting a minimum value, smoothing (e.g., log-sum-exp scoring and the like), and the like. The labels for each text value included in the extraction predictions may be selected based on the label having the highest probability score. The extraction model may also generate extraction predictions by comparing features extracted from input text data to a plurality of learned features. Feature extraction layers included in the extraction model may derive the plurality of learned features from a training dataset that includes text data for a plurality of transaction documents. Each text value included in the training dataset text data may be associated with the one or more labels. The features output by the feature extraction layers for each piece of input text data may then be fed into a fully connected layer to generate extraction predictions.

At step 406, one or more confidence features may be generated for each extraction prediction. Confidence features may include marginal probabilities generated by the CRF algorithm. Marginal probabilities may be calculated for a specific text value extracted from the document and/or a particular predicted label describing a text value. For example, the CRF algorithm may generate marginal probabilities describing the probability a particular text value has one or more labels. For example, the probability the text value "Feb. 24, 2020" is labeled "vendor" and the probability the "Feb. 24, 2020" text value is labeled "date". Marginal probabilities generated from the CRF may be based on the probability a predicted text value and or class is included in a particular sequence of text values and or classes. For example, the probability that a second text value and or class extracted from a transaction document follows a first text value and or class extracted from the transaction document. Marginal probabilities generated from the CRF may be particular to a particular transaction document type (e.g., a document type predicted by the document model). For example, the marginal probabilities for receipts from Amazon may be different than the marginal probabilities for recites from Target. Therefore, the marginal probability that a text value having a vendor label would follow a text value having an amount label would be different for the Target receipts relative to the Amazon receipts. Marginal probabilities for the total decoded text sequences may be smoothed by performing log-sum-exp scoring and the smoothed marginal probabilities may be included in confidence features.

Tag logits for text values and classes may also be provided as confidence features. Tag logits provided by the biLSTM are the unnormalized log probabilities of each label and or text value. The raw tag logits may be manipulated to generate additional confidence features. For example, mean, maximum, and minimum logit values per extracted text value and or predicted label may be computed to generate additional confidence features. The tag logits may be particular to a particular type of transaction documents because the biLSTM layers may be trained using a training data set that includes one or more particular document types. For example, the biLSTM layers may be trained using a dataset that includes on Target receipts, therefore the tag logits generated by the biLSTM will be specific to Target receipts transaction documents.

To train the confidence meta model at step 408, a confidence meta model training dataset may be assembled from the outputs of the document model and or extraction model. The confidence meta model training dataset may include a document record for each transaction document included in the sample set of transaction documents. The document records may include a document type predicted by the document model and other document features and or word features generated by the document model. The document record may also include extraction predictions including text values extracted from the set of transaction documents and labels describing the text values. During training, the confidence meta model may learn a plurality of features for extraction predictions from the document records. Based on the learned features, the confidence meta model may generate confidence scores for any input extraction predictions.

To evaluate the performance of the confidence meta model at step 412, extraction predictions for a new sample of transaction documents (i.e., a validation set) may be generated by the extraction model. Extraction predictions for the validation set may also be manually coded by hand to retrieve ground truth data at 410. Manually extracting text values and manually determining the labels for each extracted text value ensure the ground truth extraction predictions for the validation set are 100% accurate. The confidence metamodel may generate confidence scores for the extraction predictions generated by the extraction model.

At step 414, the fit between the confidence scores generated by the extraction model and the ground truth predictions is determined. If the confidence scores fit the ground truth predictions with an accepted accuracy threshold (e.g., at least 90% of the confidence scores match the ground truth data) the confidence meta model may be deployed at 418. For example, the confidence scores fit the ground truth data when at least 90% of the extraction predictions having high confidence scores (i.e., more than 0.85) match the ground truth extraction predictions and or at least 90% of the extraction predictions having low confidence scores (i.e., less than 0.85) do not match the ground truth extraction predictions. A high fit between confidence scores and ground truth data suggests the confidence meta model is able to accurately predict correct and incorrect extraction predictions generated by the extraction model. The accuracy threshold may be set to any value to require the confidence meta model to meet a more or less rigorous performance benchmark before deployment.

Other performance metrics may be used to evaluate the performance of the confidence meta model, for example, precision, recall, and F1 scores may be computed to assess model performance. Other key metrics may also be computed based on the performance of the confidence metamodel. For example, the percentage of transaction documents included in a sample having automated extraction predictions with a predicted document level precision generated by the confidence meta model of at least 90% may be used to evaluate the performance of the extraction model. Calculating the percentage of documents that could be processed accurately by the extraction model may also be used to simulate operating a document extraction system deployed at scale that handled various amounts of documents using automated text extraction. For example, the costs and memory, processing, and other resource requirements for a document extraction system that processes documents at a 90% confidence may be used to determine the costs and memory, processing and other resource requirements of a document extraction system that processes 90% of, for example, 2 million documents using automated extraction.

If at 414, the confidence scores generated by the confidence meta model do not fit the ground truth data within an excepted accuracy threshold (e.g., less than 90% of the confidence scores match the ground truth data) the confidence meta model may be retrained at step 416. For example, the confidence scores do not fit the ground truth data when less than 90% of the extraction predictions having high confidence scores (i.e., more than 0.85) match the ground truth extraction predictions and or less than 90% of the extraction predictions having low confidence scores (i.e., less than 0.85) do not match the ground truth extraction predictions. The confidence meta model may be re-trained using a different confidence meta model training set. For example, the confidence meta model training set may be modified to include more transaction documents, fewer transaction documents, and or different transaction documents. The features included in each document record may also be modified by, for example, adding new document features, incorporating fewer word features, using different confidence features, and the like. One or more hyperparameters (e.g., model size, number of feature extraction layers, training algorithms, training time, and the like) may also be modified to retrain the confidence model at step 416. After retraining, the confidence meta model may be evaluated again at step 414. If the confidence scores fit the ground truth data, the model may be deployed at step 418 or retrained again at step 416 if the confidence scores do not fit the ground truth data.

Figure 5:
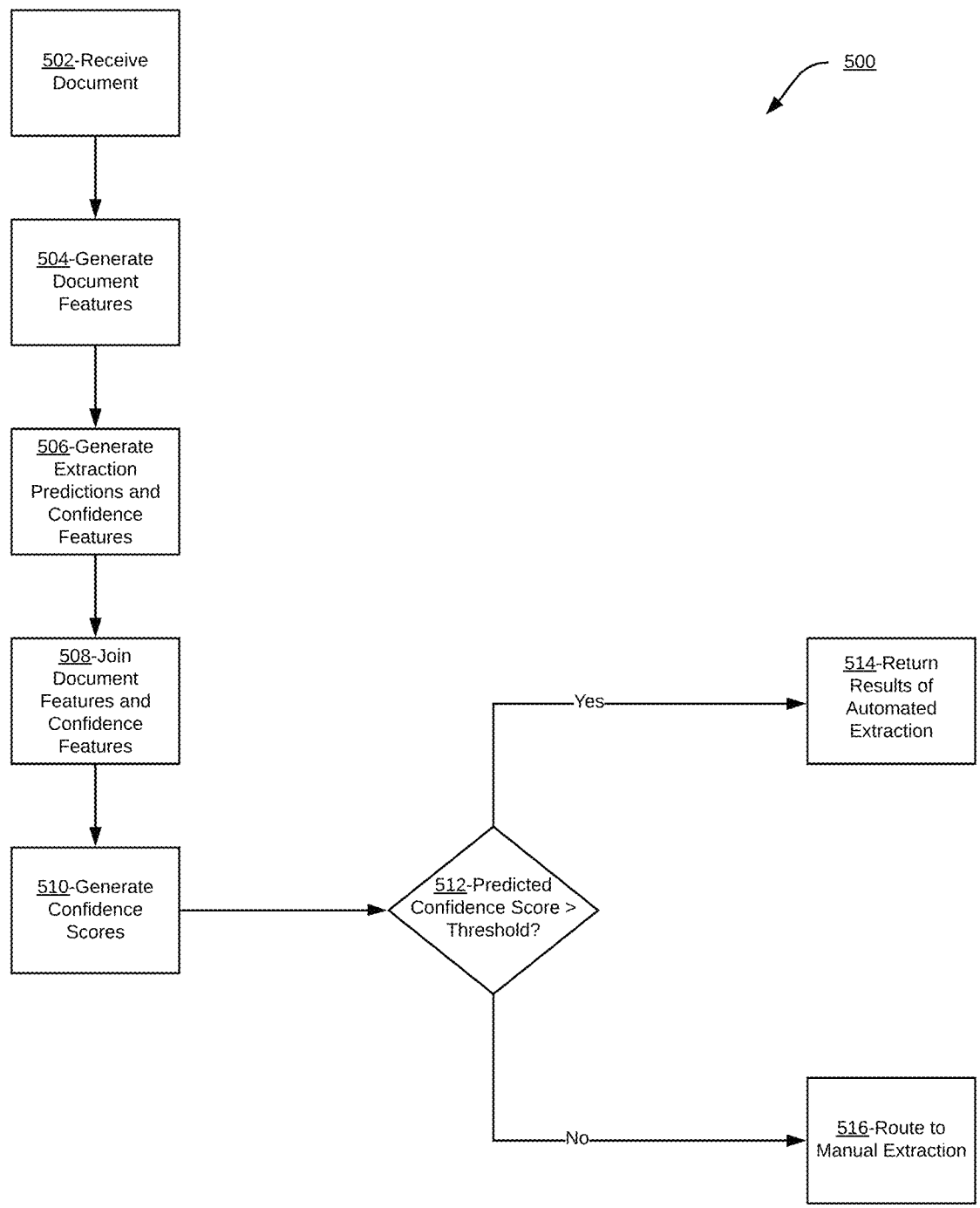
FIG. 5 shows a document routing process according to various embodiments of the present disclosure.

FIG. 5 illustrates an example document routing process 500 that may be performed using the ML system at runtime. At step 502, the document extraction system may receive a transaction document, for example, an image captured by a camera or other input device included in a client device. The text data for the transaction document may be retrieved to allow the ML system to process the transaction document and generate extraction predictions. At step 504, the document model may generate document features and or word features for the text data (e.g., TF-IDF features, Word2Vec features, and the like) as described above.

At step 506, the text data may be input into the extraction model passed to generate extraction predictions and confidence features as described above. At step 508, document features, confidence features, word features and or confidence predictions may be combined in a document record. The document record may then be input into the confidence meta model to generate extraction predictions at step 510. The confidence prediction may include a confidence score describing the likelihood the extraction predictions for a transaction document are accurate.

At step 512, if the predicted confidence score is above the confidence threshold (e.g., 0.85), automated document extraction is performed using the extraction predictions and the results are returned to a client device at 514. If the predicted confidence score is below the confidence threshold (e.g., 0.85), the document extraction task is routed to a manual extraction system for manual extraction of text values and labels at 516. The results of the manual tagging may then be returned to user after crowdsourced data entry. The routing decision generated at step 512 may be included in extraction predictions generated by the extraction model. Additionally, the confidence threshold may be set to any value with higher confidence thresholds delivering more accurate extraction results while requiring more documents to be routed to manual extraction. Conversely lower confidence threshold may deliver less accurate extraction results but allow more documents to be routed to automated extraction.

In various embodiments, the confidence threshold may be set by a user by inputting a desired confidence threshold into a user interface (UI) displayed on a client device. The confidence threshold may be altered to increase speed and/or accuracy of document extraction processes. For example, increasing the confidence threshold may guarantee more accurate document extraction results by ensuring all extraction tasks performed using the automated document extraction system have a confidence prediction at or above the confidence threshold (e.g., above 90% confidence). On the other hand, decreasing the confidence threshold may increase the amount of document extraction tasks performed using the automated document extraction system thereby increasing the speed of document extraction.

FIG. 6 shows a computing device according to an embodiment of the present disclosure. For example, computing device 600 may function as client 160 (which may include document extraction system 100 in some embodiments; one or more servers or other devices configured to provide document extraction system and/or ML system 130; or a portion or combination thereof in some embodiments. The computing device 600 may be implemented on any electronic device that runs software applications derived from compiled instructions, including without limitation personal computers, servers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable mediums 612. Each of these components may be coupled by bus 610, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, camera, and touch-sensitive pad or display. Bus 610 may be any known internal or external bus technology, including but not limited to ISA, EISA, PCI, PCI Express, USB, Serial ATA or FireWire. Computer-readable medium 612 may be any medium that participates in providing instructions to processor(s) 604 for execution, including without limitation, non-volatile storage media (e.g., optical disks, magnetic disks, flash drives, etc.), or volatile media (e.g., SDRAM, ROM, etc.).

Computer-readable medium 612 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 may establish and maintain network connections (e.g., software for implementing communication protocols, such as TCP/IP, HTTP, Ethernet, telephony, etc.).

Document extraction system instructions may include instructions that enable computing device 600 to function as an OCR system 120 and/or to provide OCR system 120 functionality as described herein. ML system instructions 620 may include instructions that enable computing device 600 to function as ML system 130 and/or to provide ML system 130 functionality as described herein. Routing system instructions 622 may include instructions that enable computing device 600 to function as a routing system 150 and/or to provide routing system 150 functionality as described herein.

Application(s) 624 may be an application that uses or implements the processes described herein and/or other processes. The processes may also be implemented in operating system 614. For example, application 624 and/or operating system may present UIs 162 including extracted text values 164 which may include results from document extraction tasks as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of improving document processing, comprising:
    acquiring text data from a plurality of documents;
    generating, by one or more base models included in a machine learning (ML) system, a document type and a set of extraction predictions for each document included in the plurality of documents, the set of extraction predictions including a plurality of text values and a plurality of labels describing the plurality of text values;
    training a meta model included in the ML system using a training dataset that includes the document type and the extraction predictions for each document included in the plurality of documents;
    acquiring input text data from a new document;
    generating, by the one or more base models, a set of extraction predictions for the new document;
    generating, by the meta model, an extraction confidence prediction for the set of extraction predictions for the new document;
    evaluating accuracy of the set of extraction predictions for the new document by comparing the extraction confidence prediction to a confidence threshold;
    in response to determining the extraction confidence prediction is above a confidence threshold, arranging the new document to be automatically extracted using the set of extraction predictions for the new document; and
    in response to determining the extraction confidence prediction is below the confidence threshold, arranging the new document to be manually extracted.

2. The method of claim 1, wherein the training further comprises:
   generating a ground truth dataset including a set of manually coded extraction predictions for each document included in the plurality of documents; and
   evaluating performance of the meta model by fitting the extraction confidence predictions for each document included in the plurality of documents to the ground truth dataset.

3. The method of claim 2, wherein the training further comprises:
   determining the extraction confidence predictions for each document included in the plurality of documents does not fit the ground truth dataset; and
   retraining the meta model using an updated training dataset that includes additional features generated by the one or more base models.

4. The method of claim 1, wherein the extraction predictions for the new document include a text value extracted from the input text data and a label describing the text value.

5. The method of claim 4, wherein the label describes a type of data included in the text value and the type of data is at least one of a vendor, a date, a payment method, a location, a purchased item, a class of goods or services, a transaction amount, an account number, and a buyer.

6. The method of claim 4, wherein the label describes a location of the text value within the document, wherein the location is expressed as a set of pixel coordinates.

7. The method of claim 1, further comprising delivering results of automated document extraction to a user by sending the results to a client device.

8. The method of claim 1, further comprising:
   delivering results of a set of manual document extraction results to a user by sending the set of manual document extraction results to a client device.

9. The method of claim 1, wherein the one or more base models include a document model having a plurality of document features and a plurality of word features.

10. The method of claim 1, further comprising generating, by an extraction model included in the one or more base models, confidence features that are used to generate the extraction confidence prediction for the set of extraction predictions for the new document.

11. A system comprising:
   a memory coupled to a computer processor; and
   a repository configured to store:
      a plurality of documents including text data;
      a new document including input text data;
      one or more base models;
      a meta model; and
   a machine learning system, executing on the computer processor and using the memory, configured to:
      acquire text data from the plurality of documents;
      generate, using the one or more base models, a document type and a set of extraction predictions for each document included in the plurality of documents, the set of extraction predictions including a plurality of text values and a plurality of labels describing the plurality of text values;
      train the meta model using a training dataset that includes the document type and the extraction predictions for each document included in the plurality of documents;
      acquire input text data from the new document;
      generate, using the one or more base models, a set of extraction predictions for the new document;
      generate, using the meta model, an extraction confidence prediction for the set of extraction predictions for the new document;
      evaluate accuracy of the set of extraction predictions for the new document by comparing the extraction confidence prediction to a confidence threshold;
      determine the extraction confidence prediction is above a confidence threshold;
      in response to determining the extraction confidence prediction is above the confidence threshold, arrange the new document to be automatically extracted using the set of extraction predictions for the new document;
      determine the extraction confidence prediction is below the confidence threshold; and
      in response to determining the confidence prediction is below the confidence threshold, arrange the new document to be manually extracted.

12. The system of claim 11, wherein the machine learning system is further configured to train the meta model by:
   generating a ground truth dataset including a set of manually coded extraction predictions for each document included in the plurality of documents; and
   evaluating performance of the meta model by fitting the extraction confidence predictions for each document included in the plurality of documents to the ground truth dataset.

13. The system of claim 12, wherein the machine learning system is further configured to train the meta model by:
   determining the extraction confidence predictions for each document included in the plurality of documents does not fit the ground truth dataset; and
   retraining the meta model using an updated training dataset that includes additional features generated by the one or more base models.

14. The system of claim 11, wherein the extraction predictions for the new document include a text value extracted from the input text data and a label describing the text value.

15. The system of claim 14, wherein the label describes a type of data included in the text value and the type of data is at least one of a vendor, a date, a payment method, a location, a purchased item, a class of goods or services, a transaction amount, an account number, and a buyer.

16. The system of claim 14, wherein the label describes a location of the text value within the document, wherein the location is expressed as a set of pixel coordinates.

17. The system of claim 11, wherein the machine learning system is further configured to deliver results of automated document extraction to a user by sending the results to a client device.

18. The system of claim 11, wherein the machine learning system is further configured to:
   deliver results of a set of manual document extraction results to a user by sending the set of manual document extraction results to a client device.

19. The system of claim 11, wherein the one or more base models include a document model having a plurality of document features and a plurality of word features.

20. The system of claim 11, wherein the machine learning system is further configured to generate an extraction model included in the one or more base models, confidence features that are used to generate the extraction confidence prediction for the set of extraction predictions for the new document.

* * * * *